(12) United States Patent
Lan

(10) Patent No.: US 8,352,199 B2
(45) Date of Patent: Jan. 8, 2013

(54) AIRFLOW-SENSING COMPUTER CURSOR GENERATOR AND AIRFLOW-SENSING MOUSE

(75) Inventor: Shih-Chieh Lan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 322 days.

(21) Appl. No.: 12/788,078

(22) Filed: May 26, 2010

(65) Prior Publication Data

US 2011/0224919 A1 Sep. 15, 2011

(30) Foreign Application Priority Data

Mar. 12, 2010 (TW) .............................. 99107260 A

(51) Int. Cl.
*G06F 1/00* (2006.01)
*G06F 19/00* (2006.01)

(52) U.S. Cl. ........... 702/45; 345/156; 345/158; 345/163

(58) Field of Classification Search .................... 702/45, 702/67, 85, 86, 92; 345/156, 158, 163
See application file for complete search history.

(56) References Cited

U.S. PATENT DOCUMENTS

| | | | | |
|---|---|---|---|---|
| 5,444,462 | A * | 8/1995 | Wambach | 345/158 |
| 7,042,438 | B2 * | 5/2006 | McRae et al. | 345/156 |
| 2010/0073293 | A1 * | 3/2010 | Itagaki | 345/163 |
| 2010/0312498 | A1 * | 12/2010 | Hamann et al. | 702/45 |

\* cited by examiner

*Primary Examiner* — John H Le
(74) *Attorney, Agent, or Firm* — Apex Juris, pllc; Tracy M. Heims

(57) ABSTRACT

An airflow-sensing computer cursor generator includes a microprocessor and plural air flow rate sensors. The plural air flow rate sensors are used for sensing airflow rates resulted from a moving action of an inductor in plural directions, thereby generating respective air flow rate signals corresponding to the plural directions. The microprocessor is used for judging a moving direction and a displacement value of the inductor according to the air flow rate signals, thereby generating a computer cursor signal.

15 Claims, 4 Drawing Sheets

AIRFLOW-SENSING COMPUTER CURSOR GENERATOR AND AIRFLOW-SENSING MOUSE

FIELD OF THE INVENTION

The present invention relates to a computer cursor generator, and more particularly to an airflow-sensing computer cursor generator.

BACKGROUND OF THE INVENTION

With increasing development of scientific technologies, multimedia products and computers become essential in our daily lives, and thus people are becoming increasingly dependent on computers. In the computer systems, peripheral input devices play important roles for communicating the computer system and the user. The common peripheral input devices of the computer systems include for example mice, keyboards and microphones. Among these peripheral input devices, mice are the most prevailing because they are very easy-to-use. When a mouse is held on the palm of a user's hand, the user may move the mouse to control movement of the cursor shown on the computer screen. In addition, by operating the click buttons of the mouse device, the user may select a desired item on the function menu of the browsing frame or execute a corresponding function.

As known, if a user spends a long time operating a mouse, the user usually experiences hand discomfort. Recently, a variety of ergonomic mice designed according to the shapes of human's palms are introduced into the market in succession. Generally, since the palms of different users have different sizes, the users may select feasible mice according to their palms' sizes. For example, since the man's palm and the woman's palm usually have different sizes, a too large or too small mouse results in a poor hand gesture. If an improper mouse is used for a long term, the user is readily suffered from muscle injuries. Moreover, even if the mouse manufacturer produces a mouse with specified appearance and volume, the fabricating cost is increased and the fabricating time is prolonged. In this situation, the inconvenience and burden of using the mouse is increased.

Therefore, it is practical and necessary to provide a non-handheld mouse in order to enhance health care of the user's hand.

SUMMARY OF THE INVENTION

An object of the present invention provides an airflow-sensing computer cursor generator for generating a computer cursor signal in an airflow-sensing manner, so that the cursor signal is generated without the need of holding the mouse by the user's palm.

In accordance with an aspect of the present invention, there is provided an airflow-sensing computer cursor generator. The airflow-sensing computer cursor generator includes plural air flow rate sensors and a microprocessor. The plural air flow rate sensors are used for sensing airflow rates resulted from a moving action of an inductor in plural directions, thereby generating respective air flow rate signals corresponding to the plural directions. The microprocessor is used for judging a moving direction and a displacement value of the inductor according to the air flow rate signals, thereby generating a computer cursor signal.

In an embodiment, the inductor is a user's finger.

In an embodiment, the plural air flow rate sensors are disposed within a box frame, and the box frame has an entrance for introducing the user's finger into an internal portion of the box frame.

In an embodiment, the plural air flow rate sensors includes a first air flow rate sensor, a second air flow rate sensor, a third air flow rate sensor and a fourth air flow rate sensor. The first air flow rate sensor is arranged in a first position of an airflow sensing space for sensing a first airflow rate resulted from the moving action of the inductor in a first direction, thereby generating a first air flow rate signal. The second air flow rate sensor is arranged in a second position of the airflow sensing space for sensing a second airflow rate resulted from the moving action of the inductor in a second direction, thereby generating a second air flow rate signal. The third air flow rate sensor is arranged in a third position of the airflow sensing space for sensing a third airflow rate resulted from the moving action of the inductor in a third direction, thereby generating a third air flow rate signal. The fourth air flow rate sensor is arranged in a fourth position of the airflow sensing space for sensing a fourth airflow rate resulted from the moving action of the inductor in a fourth direction, thereby generating a fourth air flow rate signal.

In an embodiment, the first, second, third and fourth air flow rate sensors are distributed in a rhomboidal arrangement.

In an embodiment, if the first air flow rate signal at a first time spot and the first air flow rate signal at a second time spot are different, the microprocessor judges that the inductor is moved in the first direction, and acquires a displacement value of the inductor in the first direction according to a change of the first air flow rate signal from the first time spot to the second time spot.

In an embodiment, if the second air flow rate signal at a first time spot and the second air flow rate signal at a second time spot are different, the microprocessor judges that the inductor is moved in the second direction, and acquires a displacement value of the inductor in the second direction according to a change of the second air flow rate signal from the first time spot to the second time spot.

In an embodiment, if the third air flow rate signal at a first time spot and the third air flow rate signal at a second time spot are different, the microprocessor judges that the inductor is moved in the third direction, and acquires a displacement value of the inductor in the third direction according to a change of the third air flow rate signal from the first time spot to the second time spot.

In an embodiment, if the fourth air flow rate signal at a first time spot and the fourth air flow rate signal at a second time spot are different, the microprocessor judges that the inductor is moved in the fourth direction, and acquires a displacement value of the inductor in the fourth direction according to a change of the fourth air flow rate signal from the first time spot to the second time spot.

In accordance with another aspect of the present invention, there is provided an airflow-sensing mouse device. The airflow-sensing mouse device includes a casing, plural air flow rate sensors and a microprocessor. The casing has an entrance for introducing an inductor into an internal portion of the casing. The plural air flow rate sensors are arranged in plural positions of the casing for sensing airflow rates resulted from a moving action of the inductor in plural directions, thereby generating respective air flow rate signals corresponding to the plural directions. The microprocessor is used for judging a moving direction and a displacement value of the inductor according to the air flow rate signals, thereby generating a computer cursor signal.

In an embodiment, the inductor is a user's finger.

In an embodiment, the plural air flow rate sensors includes a first air flow rate sensor, a second air flow rate sensor, a third air flow rate sensor and a fourth air flow rate sensor. The first air flow rate sensor is arranged in a first position of the casing for sensing a first airflow rate resulted from the moving action of the inductor in a first direction, thereby generating a first air flow rate signal. The second air flow rate sensor is arranged in a second position of the casing for sensing a second airflow rate resulted from the moving action of the inductor in a second direction, thereby generating a second air flow rate signal. The third air flow rate sensor is arranged in a third position of the casing for sensing a third airflow rate resulted from the moving action of the inductor in a third direction, thereby generating a third air flow rate signal. The fourth air flow rate sensor is arranged in a fourth position of the casing for sensing a fourth airflow rate resulted from the moving action of the inductor in a fourth direction, thereby generating a fourth air flow rate signal.

In an embodiment, the first, second, third and fourth air flow rate sensors are distributed in a rhomboidal arrangement.

In an embodiment, if the first air flow rate signal at a first time spot and the first air flow rate signal at a second time spot are different, the microprocessor judges that the inductor is moved in the first direction, and acquires a displacement value of the inductor in the first direction according to a change of the first air flow rate signal from the first time spot to the second time spot.

In an embodiment, if the second air flow rate signal at a first time spot and the second air flow rate signal at a second time spot are different, the microprocessor judges that the inductor is moved in the second direction, and acquires a displacement value of the inductor in the second direction according to a change of the second air flow rate signal from the first time spot to the second time spot.

In an embodiment, if the third air flow rate signal at a first time spot and the third air flow rate signal at a second time spot are different, the microprocessor judges that the inductor is moved in the third direction, and acquires a displacement value of the inductor in the third direction according to a change of the third air flow rate signal from the first time spot to the second time spot.

In an embodiment, if the fourth air flow rate signal at a first time spot and the fourth air flow rate signal at a second time spot are different, the microprocessor judges that the inductor is moved in the fourth direction, and acquires a displacement value of the inductor in the fourth direction according to a change of the fourth air flow rate signal from the first time spot to the second time spot.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
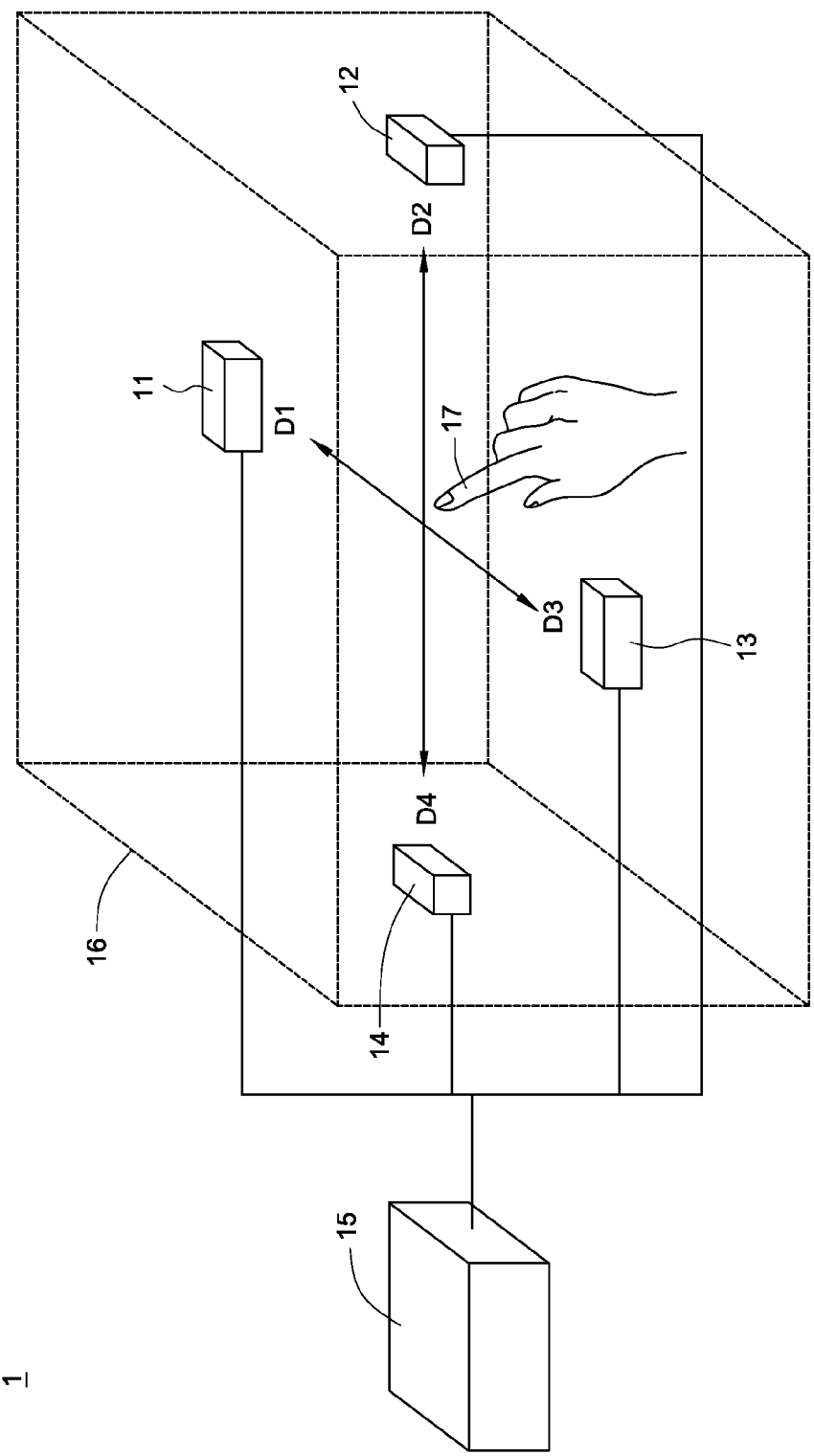
FIG. 1 is a schematic diagram illustrating an airflow-sensing computer cursor generator according to a first embodiment of the present invention.

FIG. 1 is a schematic diagram illustrating an airflow-sensing computer cursor generator according to a first embodiment of the present invention. As shown in FIG. 1, the airflow-sensing computer cursor generator 1 comprises a first air flow rate sensor 11, a second air flow rate sensor 12, a third air flow rate sensor 13, a fourth air flow rate sensor 14 and a microprocessor 15. The first air flow rate sensor 11, the second air flow rate sensor 12, the third air flow rate sensor 13 and the fourth air flow rate sensor 14 are respectively arranged in a first position (in a direction D1), a second position (in a second direction D2), a third position (in a third direction D3) and a fourth position (in a fourth direction D4) of an airflow sensing space 16. The airflow sensing space 16 is an open space that is not easily interfered by the external environment. Alternatively, the airflow sensing space 16 may be present in a close box frame that is not interfered by the airflow of the external environment.

In a case that the airflow sensing space 16 is an open space, the first, second, third and fourth air flow rate sensors 11~14 are arranged on respective holders (not shown). Whereas, in a case that the airflow sensing space 16 is present in a close box, the first, second, third and fourth air flow rate sensors 11~14 are arranged on respective edge plane surfaces of the box frame.

In an embodiment, the user's finger 17 is served as the inductor. In addition, the first, second, third and fourth positions are respectively located at the front side, the right side, the rear side and the left side of the airflow sensing space 16, so that the first, second, third and fourth air flow rate sensors 11~14 are distributed in a rhomboidal arrangement. When the user's finger 17 is moved within the airflow sensing space 16, a first air flow rate resulted from the moving action of the finger 17 in the first direction is sensed by the first air flow rate sensor 11, thereby obtaining a first air flow rate signal. Similarly, a second air flow rate resulted from the moving action of the finger 17 in the second direction is sensed by the second air flow rate sensor 12, thereby obtaining a second air flow rate signal. Similarly, a third air flow rate resulted from the moving action of the finger 17 in the third direction is sensed by the third air flow rate sensor 13, thereby obtaining a third air flow rate signal. Similarly, a fourth air flow rate resulted from the moving action of the finger 17 in the fourth direction is sensed by the fourth air flow rate sensor 14, thereby obtaining a fourth air flow rate signal.

The first, second, third and fourth air flow rate signals are received by the microprocessor 15. According to these air flow rate signals, the microprocessor 15 may judge the moving direction and the displacement value of the finger 17, thereby generating a computer cursor signal. According to the computer cursor signal, a computer cursor (not shown) is correspondingly moved on the computer screen (not shown). In other words, the microprocessor 15 may periodically detect the changes of these air flow rate signals in a fixed time cycle, thereby judging the respective displacement values of the finger 17 in the forward, rightward, rearward and leftward directions. Moreover, by vector analysis and calculation, the microprocessor 15 can acquire the moving direction and the displacement value of the finger 17.

The operating principles of the airflow-sensing computer cursor generator will be illustrated as follows. In a case that the first air flow rate signal at a first time spot and the first air flow rate signal at a second time spot are different, the microprocessor 15 judges that the finger 17 has a moving action in the first direction, and acquires the displacement value of the finger 17 in the first direction according to the change of the first air flow rate signal from the first time spot to the second time spot. Similarly, in a case that the second air flow rate signal at a first time spot and the second air flow rate signal at a second time spot are different, the microprocessor 15 judges that the finger 17 has a moving action in the second direction, and acquires the displacement value of the finger 17 in the second direction according to the change of the second air flow rate signal from the first time spot to the second time spot. Similarly, in a case that the third air flow rate signal at a first time spot and the third air flow rate signal at a second time spot are different, the microprocessor 15 judges that the finger 17 has a moving action in the third direction, and acquires the displacement value of the finger 17 in the third direction according to the change of the third air flow rate signal from the first time spot to the second time spot. Similarly, in a case that the fourth air flow rate signal at a first time spot and the second air flow rate signal at a fourth time spot are different, the microprocessor 15 judges that the finger 17 has a moving action in the fourth direction, and acquires the displacement value of the finger 17 in the fourth direction according to the change of the fourth air flow rate signal from the first time spot to the second time spot.

The relation between the displacement value X of the computer cursor shown on the computer screen and the displacement value of the finger 17 will be deduced by the following equation:

$$X=[V/(V_{max}-V_{min})] \times P;$$

In the above equation, P indicates the total pixels of the computer screen, $V_{max}$ indicates the maximum air flow rate signal generated by the air flow rate sensors 11~14, $V_{min}$ indicates the minimum air flow rate signal generated by the air flow rate sensors 11~14, and V indicates the changes of these air flow rate signals in a fixed time cycle. That is, $V/(V_{max}-V_{min})$ indicates the displacement value of the finger 17. The above equation is a preferred approach of acquiring the displacement value of the computer cursor shown on the computer screen. It is noted that, however, the approach of using the air flow rate signals to acquire the displacement value of the computer cursor may be modified while retaining the teachings of the invention.

Figure 2:
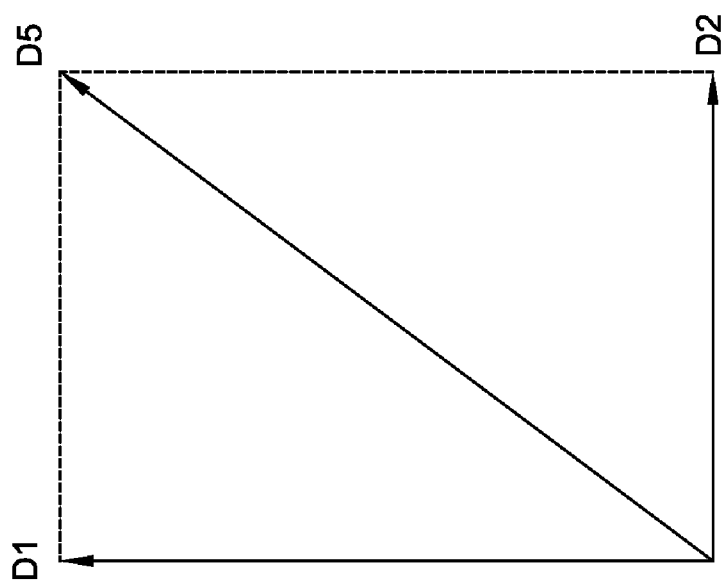
FIG. 2 is a schematic diagram illustrating a vector analysis and calculation method for use with the airflow-sensing computer cursor generator according to an embodiment of the present invention.

FIG. 2 is a schematic diagram illustrating a vector analysis and calculation method for use with the airflow-sensing computer cursor generator according to an embodiment of the present invention. In this embodiment, the displacement value of the user's finger 17 in the first direction D1 (i.e. the forward direction) is equal to 0.4 unit direction and the displacement value of the user's finger 17 in the second direction D2 (i.e. the rightward direction) is equal to 0.3 unit direction. In this situation, the microprocessor 15 will judge that the user's finger 17 is moved to direction D5 by 0.5 unit length. The vector analysis and calculation method illustrated in FIG. 2 is known to those skilled in the art, and is not redundantly described herein.

Figure 3:
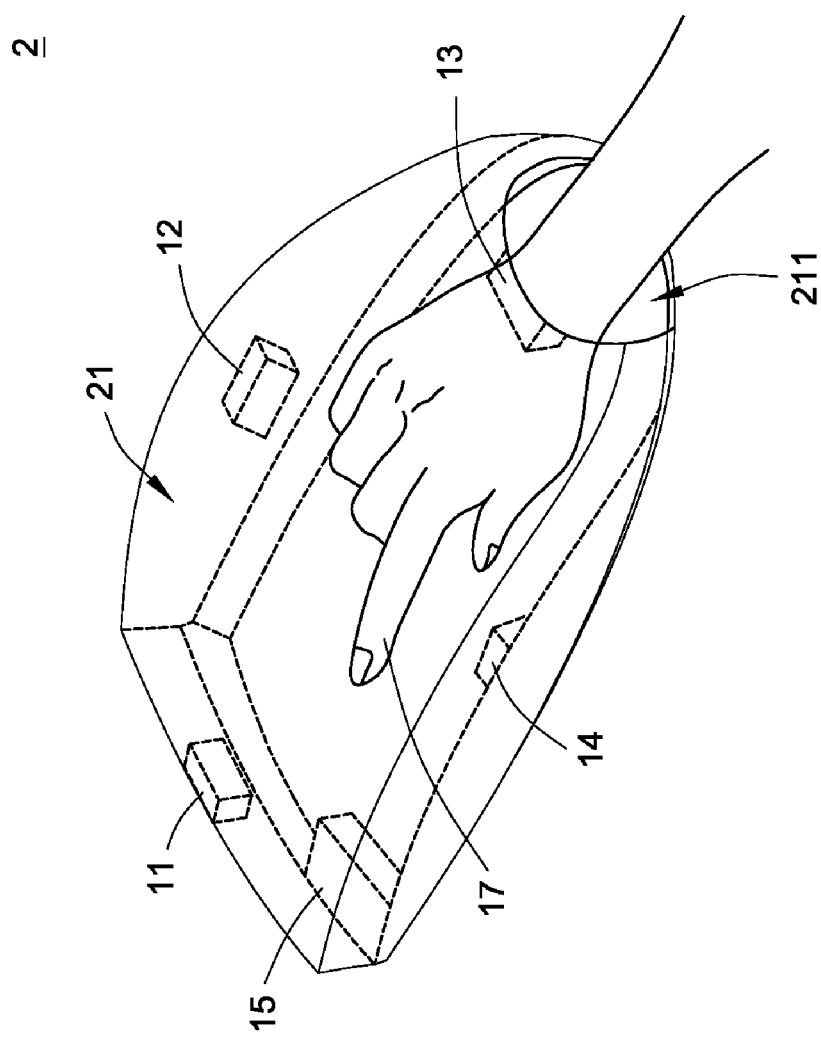
FIG. 3 is a schematic diagram illustrating an airflow-sensing mouse device according to an embodiment of the present invention.
Figure 4:
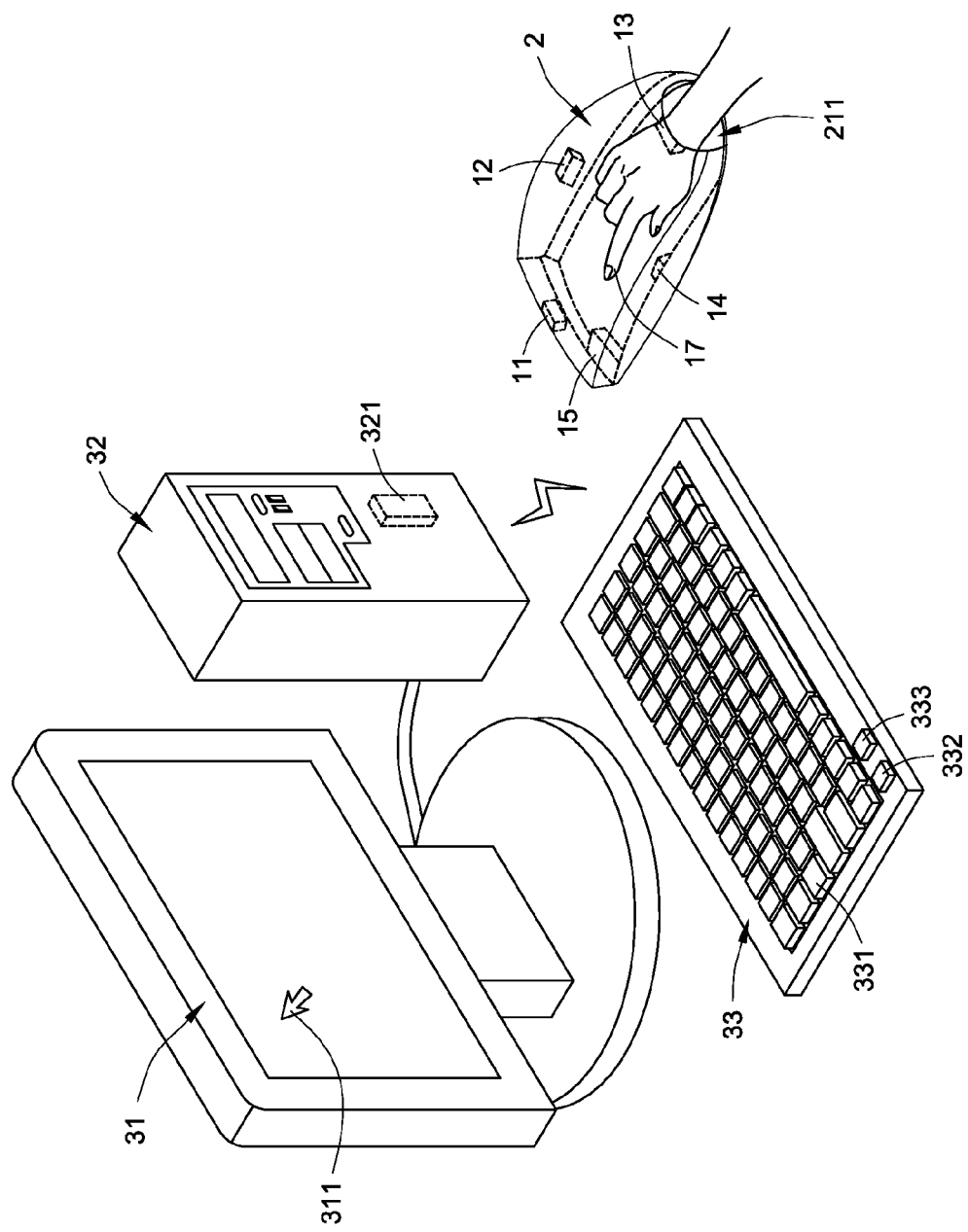
FIG. 4 is a schematic diagram illustrating a computer system using the airflow-sensing mouse device of FIG. 3.

FIG. 3 is a schematic diagram illustrating an airflow-sensing mouse device according to an embodiment of the present invention. FIG. 4 is a schematic diagram illustrating a computer system using the airflow-sensing mouse device of FIG. 3. Please refer to FIGS. 3 and 4. The airflow-sensing mouse device 2 comprises a microprocessor 15 and a casing 21. The casing 21 has an entrance 211 for introducing the finger 17 into an internal portion of the casing 21. In addition, the first, second, third and fourth air flow rate sensors 11~14 are respectively at the front side, the right side, the rear side and the left side of the casing 21. By the above-mentioned method, the microprocessor 15 will generate a computer cursor signal.

Moreover, the computer system comprises a screen 31, a computer host 32, a keyboard 33 and the airflow-sensing mouse device 2. The computer host 32 has a central processing unit 321, which is in communication with the microprocessor 15. After the computer cursor signal is generated by the microprocessor 15, the computer cursor signal is transmitted to the central processing unit 321. According to the computer cursor signal, the computer 3 will execute an action of moving the computer cursor 311, and output the computer cursor 311 on the screen 31. The keyboard 33 has plural keys 331. Via the keys 331, the user may input characters or symbols. Moreover, the keyboard 33 further comprises a first key zone 332 and a second key zone 333. The first key zone 332 and the second key zone 333 have the same functions as the left and right click buttons of the conventional mouse in order to assist in operating the airflow-sensing mouse device 2.

From the above description, the airflow-sensing computer cursor generator uses plural air flow rate sensors to detect the change of the air flow rate resulted from a moving action of the user's finger, thereby acquiring a moving direction and a displacement value of the finger and generating a corresponding computer cursor signal. That is, the airflow-sensing computer cursor generator can effectively replace the pointing function of the conventional mouse. Since the mouse having the airflow-sensing computer cursor generator of the present invention is operated in a non-handheld manner, the problem of causing muscle injuries when the conventional handheld mouse is held by the user for a long term will be obviated. By the way, the inductor used in the present invention is not restricted to the user's finger. Any object is feasible as the inductor of the present invention as long as the moving action of the object is detectable by the plural air flow rate sensors.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An airflow-sensing computer cursor generator, comprising:
    plural air flow rate sensors for sensing airflow rates resulted from a moving action of an inductor in plural directions, thereby generating respective air flow rate signals corresponding to said plural directions;
    a microprocessor for judging a moving direction and a displacement value of said inductor according to said air flow rate signals, thereby generating a computer cursor signal;
    wherein said inductor is a user's finger; and
    wherein said plural air flow rate sensors are disposed within a box frame, and said box frame has an entrance for introducing said user's finger into an internal portion of said box frame.

2. The airflow-sensing computer cursor generator according to claim 1 wherein said plural air flow rate sensors comprises:
    a first air flow rate sensor arranged in a first position of an airflow sensing space for sensing a first airflow rate resulted from said moving action of said inductor in a first direction, thereby generating a first air flow rate signal;

a second air flow rate sensor arranged in a second position of said airflow sensing space for sensing a second airflow rate resulted from said moving action of said inductor in a second direction, thereby generating a second air flow rate signal;

a third air flow rate sensor arranged in a third position of said airflow sensing space for sensing a third airflow rate resulted from said moving action of said inductor in a third direction, thereby generating a third air flow rate signal;

a fourth air flow rate sensor arranged in a fourth position of said airflow sensing space for sensing a fourth airflow rate resulted from said moving action of said inductor in a fourth direction, thereby generating a fourth air flow rate signal.

3. The airflow-sensing computer cursor generator according to claim 2 wherein said first, second, third and fourth air flow rate sensors are distributed in a rhomboidal arrangement.

4. The airflow-sensing computer cursor generator according to claim 2 wherein if said first air flow rate signal at a first time spot and said first air flow rate signal at a second time spot are different, said microprocessor judges that said inductor is moved in said first direction, and acquires a displacement value of said inductor in said first direction according to a change of said first air flow rate signal from said first time spot to said second time spot.

5. The airflow-sensing computer cursor generator according to claim 2 wherein if said second air flow rate signal at a first time spot and said second air flow rate signal at a second time spot are different, said microprocessor judges that said inductor is moved in said second direction, and acquires a displacement value of said inductor in said second direction according to a change of said second air flow rate signal from said first time spot to said second time spot.

6. The airflow-sensing computer cursor generator according to claim 2 wherein if said third air flow rate signal at a first time spot and said third air flow rate signal at a second time spot are different, said microprocessor judges that said inductor is moved in said third direction, and acquires a displacement value of said inductor in said third direction according to a change of said third air flow rate signal from said first time spot to said second time spot.

7. The airflow-sensing computer cursor generator according to claim 2 wherein if said fourth air flow rate signal at a first time spot and said fourth air flow rate signal at a second time spot are different, said microprocessor judges that said inductor is moved in said fourth direction, and acquires a displacement value of said inductor in said fourth direction according to a change of said fourth air flow rate signal from said first time spot to said second time spot.

8. An airflow-sensing mouse device, comprising:
a casing having an entrance for introducing an inductor into an internal portion of said casing;
plural air flow rate sensors arranged in plural positions of said casing for sensing airflow rates resulted from a moving action of said inductor in plural directions, thereby generating respective air flow rate signals corresponding to said plural directions; and a microprocessor for judging a moving direction and a displacement value of said inductor according to said air flow rate signals, thereby generating a computer cursor signal.

9. The airflow-sensing mouse device according to claim 8 wherein said inductor is a user's finger.

10. The airflow-sensing mouse device according to claim 8 wherein said plural air flow rate sensors comprises:
a first air flow rate sensor arranged in a first position of said casing for sensing a first airflow rate resulted from said moving action of said inductor in a first direction, thereby generating a first air flow rate signal;
a second air flow rate sensor arranged in a second position of said casing for sensing a second airflow rate resulted from said moving action of said inductor in a second direction, thereby generating a second air flow rate signal;
a third air flow rate sensor arranged in a third position of said casing for sensing a third airflow rate resulted from said moving action of said inductor in a third direction, thereby generating a third air flow rate signal;
a fourth air flow rate sensor arranged in a fourth position of said casing for sensing a fourth airflow rate resulted from said moving action of said inductor in a fourth direction, thereby generating a fourth air flow rate signal.

11. The airflow-sensing mouse device according to claim 10 wherein said first, second, third and fourth air flow rate sensors are distributed in a rhomboidal arrangement.

12. The airflow-sensing mouse device according to claim 10 wherein if said first air flow rate signal at a first time spot and said first air flow rate signal at a second time spot are different, said microprocessor judges that said inductor is moved in said first direction, and acquires a displacement value of said inductor in said first direction according to a change of said first air flow rate signal from said first time spot to said second time spot.

13. The airflow-sensing mouse device according to claim 10 wherein if said second air flow rate signal at a first time spot and said second air flow rate signal at a second time spot are different, said microprocessor judges that said inductor is moved in said second direction, and acquires a displacement value of said inductor in said second direction according to a change of said second air flow rate signal from said first time spot to said second time spot.

14. The airflow-sensing mouse device according to claim 10 wherein if said third air flow rate signal at a first time spot and said third air flow rate signal at a second time spot are different, said microprocessor judges that said inductor is moved in said third direction, and acquires a displacement value of said inductor in said third direction according to a change of said third air flow rate signal from said first time spot to said second time spot.

15. The airflow-sensing mouse device according to claim 10 wherein if said fourth air flow rate signal at a first time spot and said fourth air flow rate signal at a second time spot are different, said microprocessor judges that said inductor is moved in said fourth direction, and acquires a displacement value of said inductor in said fourth direction according to a change of said fourth air flow rate signal from said first time spot to said second time spot.

* * * * *